United States Patent
Bhattacharjee et al.

(10) Patent No.: US 8,429,261 B2
(45) Date of Patent: Apr. 23, 2013

(54) METHODS AND SYSTEMS FOR MANAGING A DEVICE IN A WEB BASED ENTERPRISE MANAGEMENT ENVIRONMENT

(75) Inventors: Satadal Bhattacharjee, Fremont, CA (US); Scott W. Kirvan, Austin, TX (US); Yanling Qi, Austin, TX (US)

(73) Assignee: LSI Corporation, San Jose, CA (US)

( * ) Notice: Subject to any disclaimer, the term of this patent is extended or adjusted under 35 U.S.C. 154(b) by 799 days.

(21) Appl. No.: 12/264,080

(22) Filed: Nov. 3, 2008

(65) Prior Publication Data

US 2010/0115076 A1    May 6, 2010

(51) Int. Cl.
*G06F 15/173* (2006.01)
(52) U.S. Cl.
USPC .......................................................... 709/223
(58) Field of Classification Search .................. 709/223, 709/224, 227, 229; 717/100, 136
See application file for complete search history.

(56) References Cited

U.S. PATENT DOCUMENTS

| | | | |
|---|---|---|---|
| 6,854,122 B1* | 2/2005 | Sheriff et al. | 719/316 |
| 6,971,090 B1* | 11/2005 | Gruttadauria et al. | 717/136 |
| 2003/0055862 A1* | 3/2003 | Bhat | 709/101 |
| 2003/0149771 A1* | 8/2003 | Wookey et al. | 709/227 |
| 2004/0117435 A1* | 6/2004 | Rossmanith et al. | 709/202 |

OTHER PUBLICATIONS

Hand, Steve. "Interoperable Management over Web Services." Oct. 28, 2007.*

* cited by examiner

*Primary Examiner* — Scott Christensen
(74) *Attorney, Agent, or Firm* — Duft Bornsen & Fettig LLP

(57) ABSTRACT

Methods and systems for managing a device in a Web Based Enterprise Management ("WBEM") environment. At least a management software component and a device management adapter are reused through receiving a network command from the management software component, and forwarding the network command to the device management adapter for conversion to a device message. The WBEM environment is supported by packaging the device message in a WBEM envelope, and transmitting the device message in the WBEM envelope to a computer system. The computer system comprises the device. Subsequently, a native command based on the device message is issued to the device.

20 Claims, 6 Drawing Sheets

METHODS AND SYSTEMS FOR MANAGING A DEVICE IN A WEB BASED ENTERPRISE MANAGEMENT ENVIRONMENT

BACKGROUND

1. Field of the Invention

The invention relates generally to device management and more specifically relates to device management in a Web Based Enterprise Management ("WBEM") environment.

2. Discussion of Related Art

Web Based Enterprise Management ("WBEM") comprises standard-based technologies for a client to communicate system/device management messages with a computer system. Because WBEM is extensible and provides platform-neutral tools and applications that are reusable, WBEM has become one of the most popular choices for managing computer systems and their devices. In some environments, WBEM is the only choice offered for a vendor to support device management. For example, in order to manage a device in the VMware ESX Server product and certain embedded operating environments, a vendor either is required to conform to the WBEM standard or offers no device management at all.

Offering no device management is unacceptable. However, conforming to the WBEM standard generally results in the abandonment of valuable investments in existing tools, applications, and management libraries that already operate in non-WBEM environments. Many customers are already familiar with the existing tools and applications. Similarly, many software developers are also already familiar with the existing management libraries rather than the new WBEM technologies. Accordingly, developing a brand new set of tools, applications, and management libraries is not only costly, but is also burdensome to customers and software developers.

Thus it is an ongoing challenge to support device management in a WBEM environment.

SUMMARY

The present invention solves the above and other problems, thereby advancing the state of the useful arts, by providing methods and systems for managing a device in a Web Based Enterprise Management ("WBEM") environment. At least a management software component and a device management adapter are reused through receiving a network command from the management software component, and forwarding the network command to the device management adapter for conversion to a device message. The WBEM environment is supported by packaging the device message in a WBEM envelope, and transmitting the device message in the WBEM envelope to a computer system. The computer system comprises the device. Subsequently, a native command based on the device message is issued to the device. Beneficially, components of the existing tools, applications, and/or management libraries are thus reused to support device management in the WBEM environment.

In one aspect hereof, a method is provided for managing a device in a Web Based Enterprise Management ("WBEM") environment. The method comprises receiving a network command from a management software component, and forwarding the network command to a device management adapter for conversion to a device message. The method also comprises packaging the device message in a WBEM envelope. Additionally, the method comprises transmitting the device message in the WBEM envelope to a computer system. The computer system comprises the device. The method also comprises issuing a native command to the device based on the device message.

Another aspect hereof provides a method for managing a device in a Web Based Enterprise Management ("WBEM") environment. The method comprises receiving a device message from the device, and packaging the device message in a WBEM envelope for transmission. The method also comprises receiving the device message in the WBEM envelope from a computer system. The computer system comprises the device. The method further comprises extracting the device message from the WBEM envelope. Additionally, the method comprises receiving a network command based on the device message from a device management adapter, and forwarding the network command to a management software component.

Yet another aspect hereof provides a system for managing a device in a Web Based Enterprise Management ("WBEM") environment. The system comprises a management workstation and a computer system. The management workstation comprises a management software component and a device management adapter. The management workstation also comprises a network proxy layer for receiving a network command from the management software component, and for forwarding the network command to the device management adapter for conversion to a device message. Additionally, the management workstation comprises a marshaling layer for packaging the device message in a WBEM envelope, and for transmitting the device message in the WBEM envelope to a computer system. The computer system comprises the device and a Common Information Model ("CIM") provider for issuing a native command to the device based on the device message.

DETAILED DESCRIPTION OF THE DRAWINGS

Figure 1:
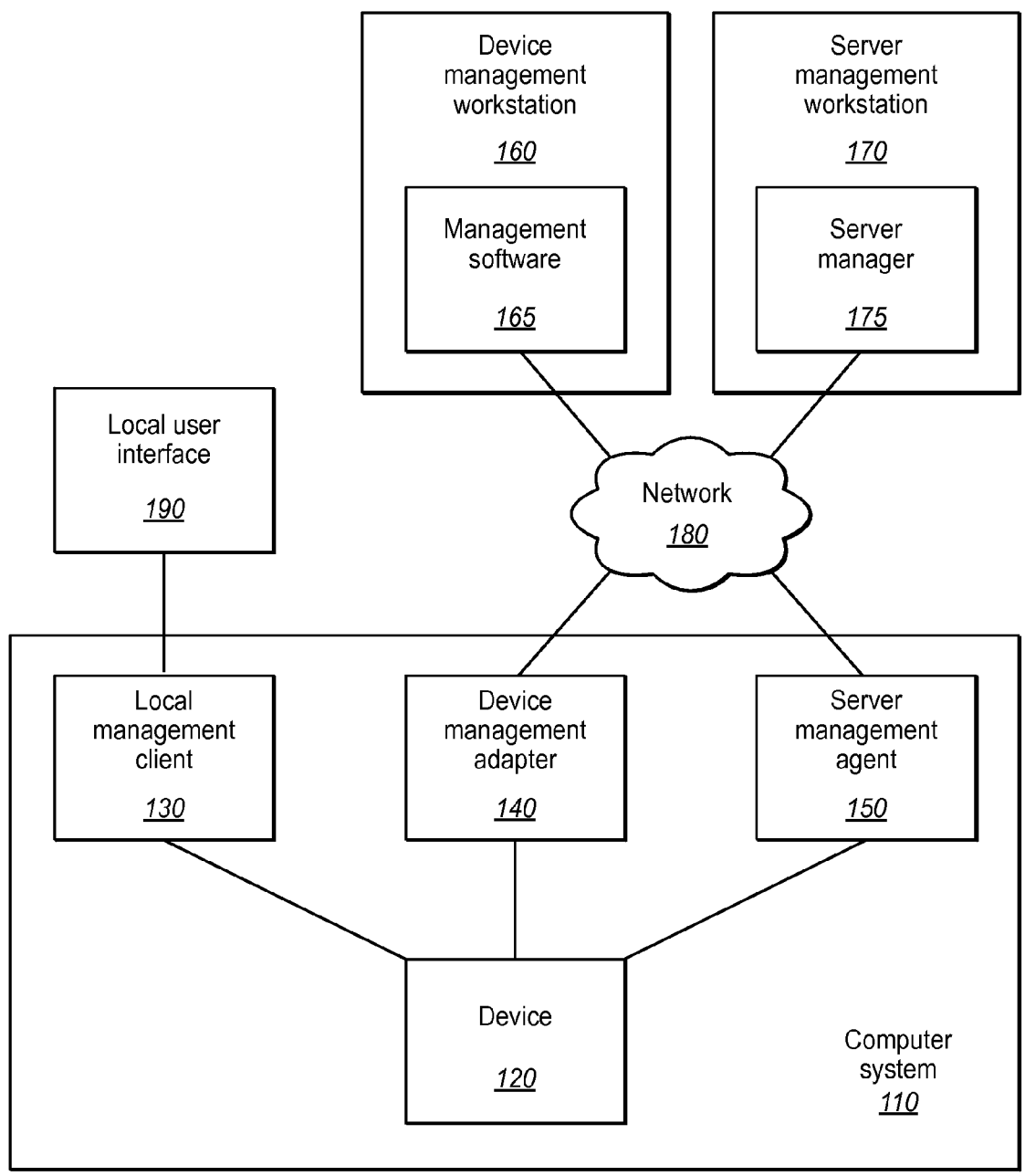
FIG. 1 is a block diagram of an exemplary system for managing a device in a non-WBEM environment.

FIG. 1 is a block diagram of an exemplary system for managing a device in a non-WBEM environment. As will be explained in greater detail, components of this exemplary system are reused to support device management in a WBEM environment. Innovatively, a network proxy layer is provided to support certain networking links, and a marshaling layer is provided to support communication within the WBEM environment.

In the non-WBEM environment, a computer system 110 is in communication with a device management workstation 160 and a server management workstation 170 through a network 180. The computer system 110 also supports a local user interface 190. The computer system 110 may be a computer server, a computer client, or any computing system that comprises the device 120 to be managed. The device management workstation 160 and the server management workstation 170 may be any computing system from which the device 120 and/or the computer system 110 are managed.

As noted above, the computer system 110 comprises the device 120 to be managed. The device 120 may be a controller, a disk drive, or any component of the computing system 110 to be managed. The computer system 110 comprises a local management client 130 that supports the local user interface 190. For example, the local user interface 190 may comprise a graphical user interface ("GUI") and/or a command line interface ("CLI") that is supported with a computer display, keyboard, and/or mouse. The local management client 130 comprises computer instructions for issuing native commands to the device 120 based on user input through the local user interface 190.

The computer system 110 also comprises a device management adapter 140. The device management adapter 140 comprises computer instructions that allow communications through the network 180 with the device management workstation 160. The device manager adapter 140 also comprises computer instructions for issuing native commands to, and receiving device messages from, the device 120. Similarly, the computer system 110 comprises a server management agent 150. The server management agent 150 comprises computer instructions that allow communications through the network 180 with the server management workstation 170. The server management agent 150 further comprises computer instructions for issuing native commands to, and receiving device messages from, the device 120. The network 180 may be any computing network including a TCP/IP network.

The device management workstation 160 comprises a management software 165. The management software 165 comprises computer instructions for creating network commands to be communicated through the network 180 to the device management adapter 140. For example, the management software 165 may create a network command in response to a high level command that a user enters through a high level management command interface (e.g., GUI and/or CLI). The management software 165 may also create a network command as a result of a management libraries being invoked by another piece of software. The management software 165 also comprises computer instructions for receiving device messages through the network 180 from the device management adapter 140. Native commands that are issued to the device 120 are based on the network commands, while the network messages are based on devices messages received/originated from the device 120. The management software 165, as a tool, application, and/or software libraries, thus allows a user of the device management workstation 160 to manage the device 120. It will be understood that the management software 165 can likewise manage multiple devices (each similar to the device 120) of the computer system 110, and/or manage multiple devices of multiple computer systems. The management software 165 is typically provided by a vendor/manufacturer of the device 120.

Similarly, the server management workstation 170 comprises a server manager 175 for managing the computer system 110 including the device 120. The server manager 175 comprises computer instructions for creating network commands to be communicated through the network 180 to the server management agent 150. The server manager 175 may create a network command similar to the management software 165 discussed above. The server manager 175 also comprises computer instructions for receiving network messages through the network 180 from the server management agent 150. Native commands that are issued to the device 120 are based on the network commands, while the network messages are based on devices messages received from the device 120. The server manager 175, as a tool, application, and/or software libraries, thus allows a user of the server management workstation 170 to manage the device 120. The server manager 175 is typically provided by a vendor/manufacturer of the computer system 110 for managing the computer system 110 including the device 120. In some instances, multiple computer systems may be managed by the server manager 175.

Figure 2:
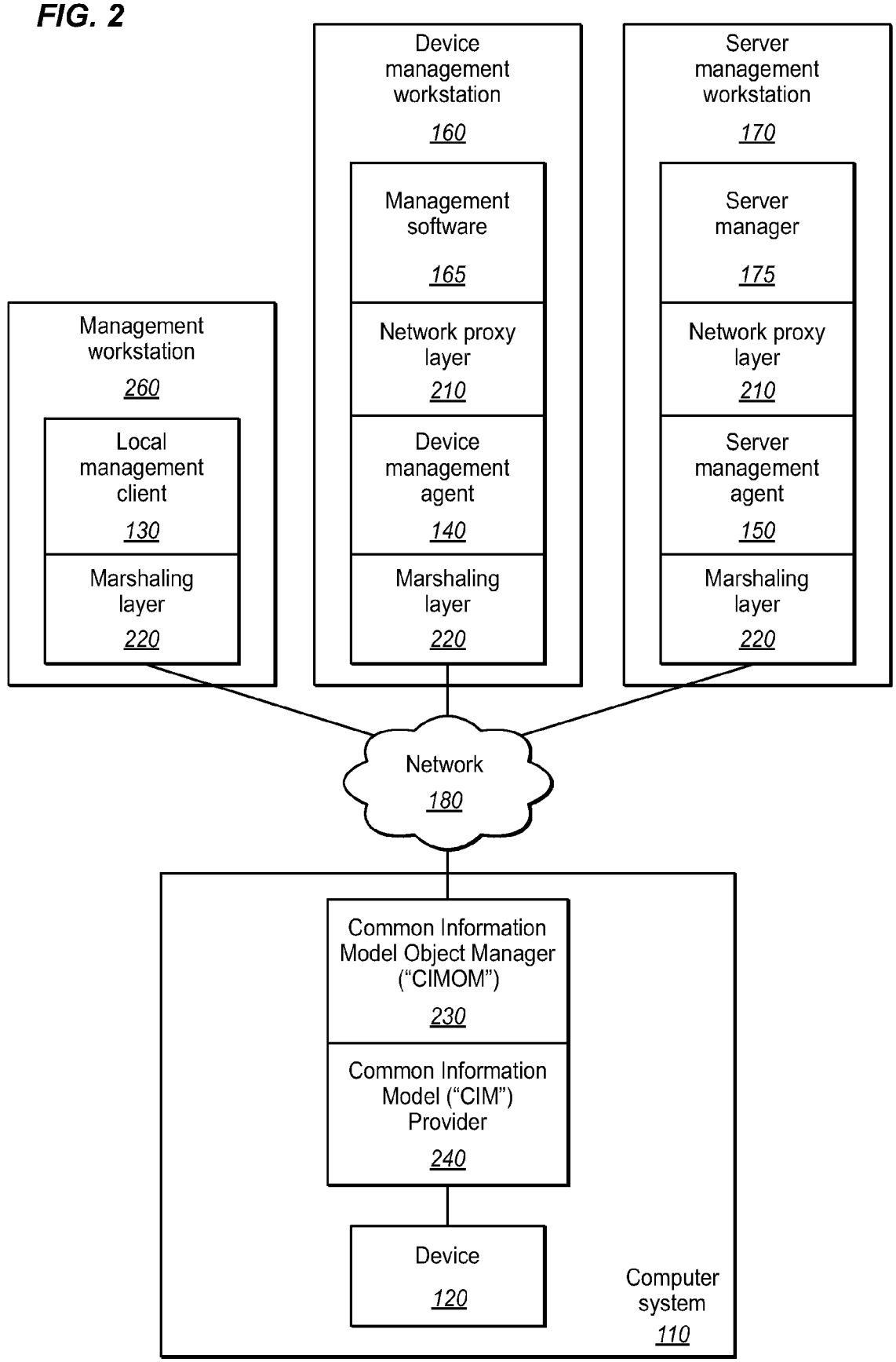
FIG. 2 is a block diagram of an exemplary system for managing a device in a WBEM environment in accordance with features and aspects hereof.

FIG. 2 is a block diagram of an exemplary system for managing a device in a WBEM environment in accordance with features and aspects hereof. As noted above, components of the exemplary system from the non-WBEM environment are reused to support device management in the WBEM environment. More specifically, a network proxy layer 210 is provided to support network links between the management software 165 and the device management adapter 140, and/or between the server manager 175 and the server management agent 150. Advantageously, a marshaling layer 220 is also provided to support communication within the WBEM environment over the network 180 with the computer system 110. The protocol for communication over the network 180 comprises Hypertext Transfer Protocol ("HTTP").

In the WBEM environment, the computer system 110 is in communication with the device management workstation 160, the server management workstation 170, and a management workstation 260. The computer system 110 comprises a Common Information Model Object Manager ("CIMOM") 230, a Common Information Model ("CIM") provider 240, and the device 120. The CIMOM 230 acts as a server that receives and processes a message that conforms to the WBEM standard. The message is directed to the device 120. Similarly, the CIMOM 230 also transmits a device message initiated by the device 120.

It will be understood that the CIMOM 230 typically allows a client to interact indirectly with the device 120 through a model of the device 120. The model is defined using the CIM standard. Here, a CIM model is extended to include and support the following: a wrapper for native commands, invoking a native command, a wrapper for device messages (initiated by the device 120), and discovering the device 120 that is supported through the CIMOM 230. The CIMOM 230 in conjunction with the CIM provider 240 comprises computer instructions to support the extended CIM model. More specifically, after extracting a device message from a WBEM envelope at the CIMOM 230, the CIM provider 240 issues a native command to the device 120 based on the device message. Those skilled in the art will readily recognize that the CIM provider 240 thus issues the same native commands in the WBEM environment similar to (and effectively serving as a proxy for) the local management client 130, the device management adapter 140, and the server management agent 150 of the non-WBEM environment. Additionally, after receiving at the CIM provider 240 a device message from the device 120, the CIM provider 240 packages the device message in a WBEM envelope for transmission by the CIMOM 230 to the marshaling layer 220.

A "WBEM envelope" generally refers to a wrapper and/or file format/structure comprising headers and/or fields in which data can be encapsulated. While the wrapper and/or the file format/structure conform to the WBEM standard, the data alone does not necessarily conform to the WBEM standard without the WBEM envelope. Those skilled in the art will recognize that CIM-XML is currently the protocol for exchanging CIM information, and CIM-XML uses xmlCIM as the payload and HTTP as the transport.

The management workstation 260 comprises the local management client 130. Rather than issuing native commands to the device 120 directly, the local management client 130 uses the marshaling layer 220 for wrapping the native command in a WBEM envelope. The marshaling layer 220 is in communication with the CIMOM 230 of the computer system 110 through the network 180 so that the native command is ultimately issued by the CIM provider 240 to the device 120. Additionally, the marshaling layer 220 comprises computer instructions for receiving a device message originated from the device 120. Because the device message is encapsulated in a WBEM envelope, the marshaling layer 220 extracts the device message from the WBEM envelope and forwards the device message to the local management client 130. It will be understood that the local user interface 190 described above may also be supported by the management workstation 260 to allow a user to manage the device 120.

The device management workstation 160 comprises the management software 165, the network proxy layer 210, the device management adapter 140, and the marshaling layer 220. In the non-WBEM environment described above, the management software 165 and the device management adapter 140 are in communication over the network 180. Here, the network proxy layer 210 is provided in the WBEM environment to allow communication between the management software 165 and the device management adapter 140. Accordingly, the management software 165 and the device management adapter 140 are reused for creating a network command, and for converting the network command to a device message. Similarly, when the device management adapter 140 receives a device message originated from the device 120, the device management adapter 140 converts the device message to a network command to be processed by the management software 165.

The network proxy layer 210 may comprise computer instructions that allow the management software 165 and the device management adapter 140 to behave as if they are separated by a network. Alternatively, the network proxy layer 210 may comprise computer instructions that replace certain portions of the management software 165 and the device management adapter 140 for them to communication without the network.

Rather than issuing a native command to the device 120 directly, the device management adapter 140 uses the marshaling layer 220 for wrapping the device message (that comprises the native command) in a WBEM envelope. As noted above, the marshaling layer 220 is in communication with the CIMOM 230 of the computer system 110 through the network 180 so that the native command is ultimately issued by the CIM provider 240 to the device 120. Also as noted above, the marshaling layer 220 comprises computer instructions for receiving a device message originated from the device 120. The marshaling layer 220 extracts and forwards the device message to the device management adapter 140, so that the device message is ultimately received by the management software 165 as a network message. Accordingly, the management software 165 thus allows a user of the device management 160 to manage the device 120 in the WBEM environment.

The server management workstation 170 comprises the server manager 175, the network proxy layer 210, the server management agent 150, and the marshaling layer 220. It will be readily recognized that the server manager 175 is similar to the management software 165 of the device management workstation 160 as the components are reused in the WBEM environment. Likewise, the server management agent 150 is similar to the device management adapter 140 of the device management workstation 160 as the components are reused in the WBEM environment. The descriptions above with respect to the management software 165 and device management adapter 140 are applicable to the server manager 170 and the server management agent 150 and are not repeated. However, it will be understood that while the components are similar, they are not likely to be identical. Thus, although the same network proxy layer 210 is shown in the server management workstation 170 as providing similar functions, it is not likely to be identical to the network proxy layer 210 shown in the device management workstation 160. It will also be understood that another exemplary system may comprise one or any number of the management workstation 260, device management workstation 160, and the server management workstation 170.

Those of ordinary skill in the art will readily recognize numerous additional and equivalent components and modules within a fully functional system. Such additional and equivalent components are omitted herein for simplicity and brevity of this discussion. Thus, the structures of FIGS. 1 through 2 are intended merely as representatives of exemplary embodiments of features and aspects hereof.

Figure 3:
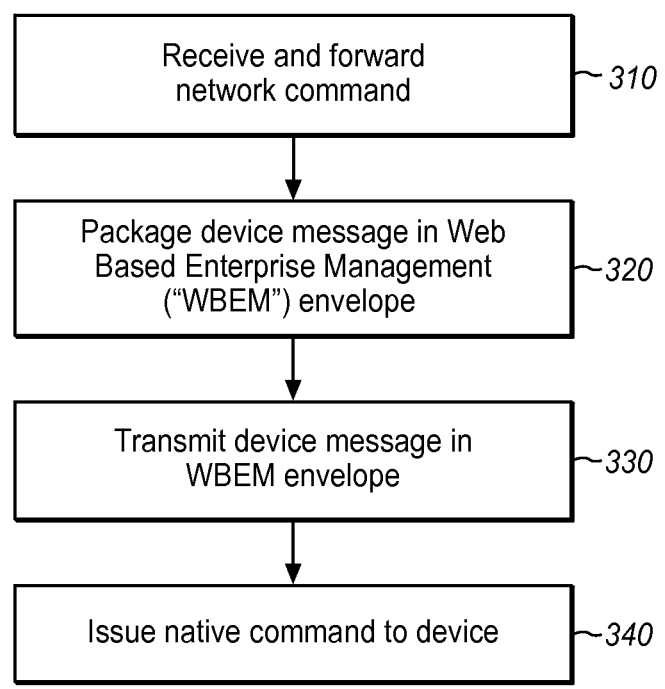
FIG. 3 is a flowchart describing an exemplary method in accordance with features and aspects hereof to manage a device in a WBEM environment.

FIG. 3 is a flowchart describing an exemplary method in accordance with features and aspects hereof to manage a device in a WBEM environment. At step 310, the network proxy layer receives a network command from the management software (or the server manager), and forwards the network command to the device management adapter (or the device management adapter). At step 320, the marshaling layer packages a devices message (that is based on the network command) in a WBEM envelope. At step 330, the marshaling layer transmits the device message in the WBEM envelope from the device management workstation (or the server management workstation) over the network to the computer system. At step 340, a native command based on the device message is subsequently issued to the device.

Figure 4:
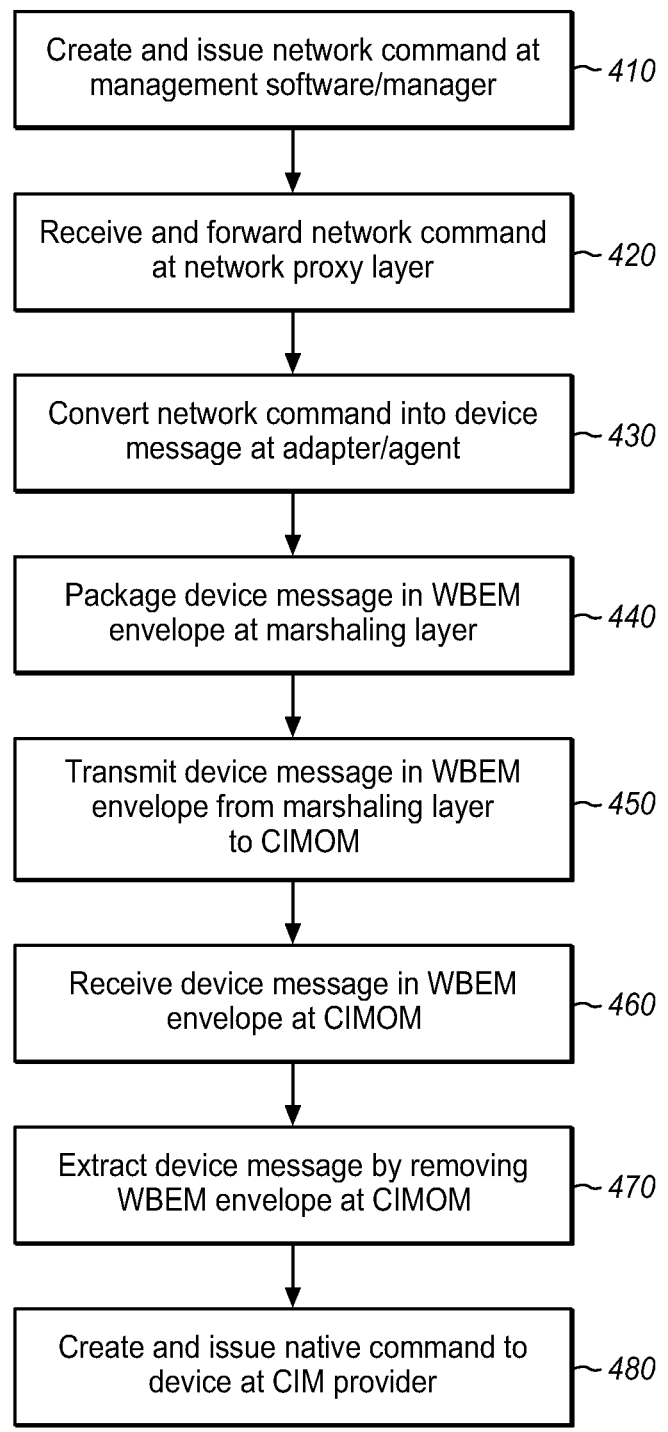
FIG. 4 is a flowchart describing exemplary additional details to manage a device in a WBEM environment.

FIG. 4 is a flowchart describing exemplary additional details to manage a device in a WBEM environment. At step 410, a network command is created and issued at the management software (or the server manager). The network command may be created based on user input at the device management workstation (or the server management workstation). Rather than issuing the network command over a network as in a non-WBEM environment, the network command is received by the network proxy layer, which forwards the network command to the device management adapter (or the server management agent) at step 420. At step 430, the device management adapter (or the server management agent) converts the network command into a device message rather than issuing a native command directly to the device. At step 440, the marshaling layer packages the device message in a WBEM envelope. At step 450, the marshaling layer transmits the device message in the WBEM envelope to the CIMOM.

At step 460, the CIMOM receives the device message in the WBEM envelope. The CIMOM extracts the device message by removing the WBEM envelope at step 470. Based on the CIM model that has been extended, the CIMOM invokes the CIM provider such that the CIM provider creates and issues at step 480 a native command to the device based on the device message. Accordingly, a user of the device management workstation (or the server management workstation) is able to issue the native command to the device in the WBEM environment by reusing non-WBEM components.

Figure 5:
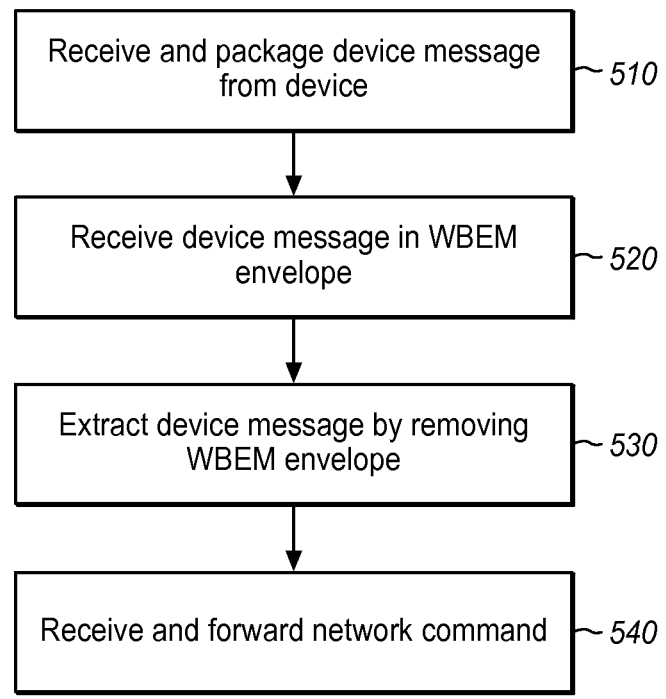
FIG. 5 is a flowchart describing an alternate exemplary method in accordance with features and aspects hereof to manage a device in a WBEM environment.

FIG. 5 is a flowchart describing an alternate exemplary method in accordance with features and aspects hereof to manage a device in a WBEM environment. At step 510, the CIM provider receives a device message from the device, and packages the device message in a WBEM envelope. The CIMOM of the computer system transmits the device message in the WBEM envelope to the marshaling layer of the device management workstation (or the server management workstation). The marshaling layer receives the device message in the WBEM envelope at step 520, and extracts the device message by removing the WBEM envelope at step 530. At step 540, the network proxy layer receives a network command (that is based on the device message), and subsequently forwards the network command to the management software (or the server manager). A user of the management software (or the server manager) is then able to observe the device message originated from the device of the computer system.

Figure 6:
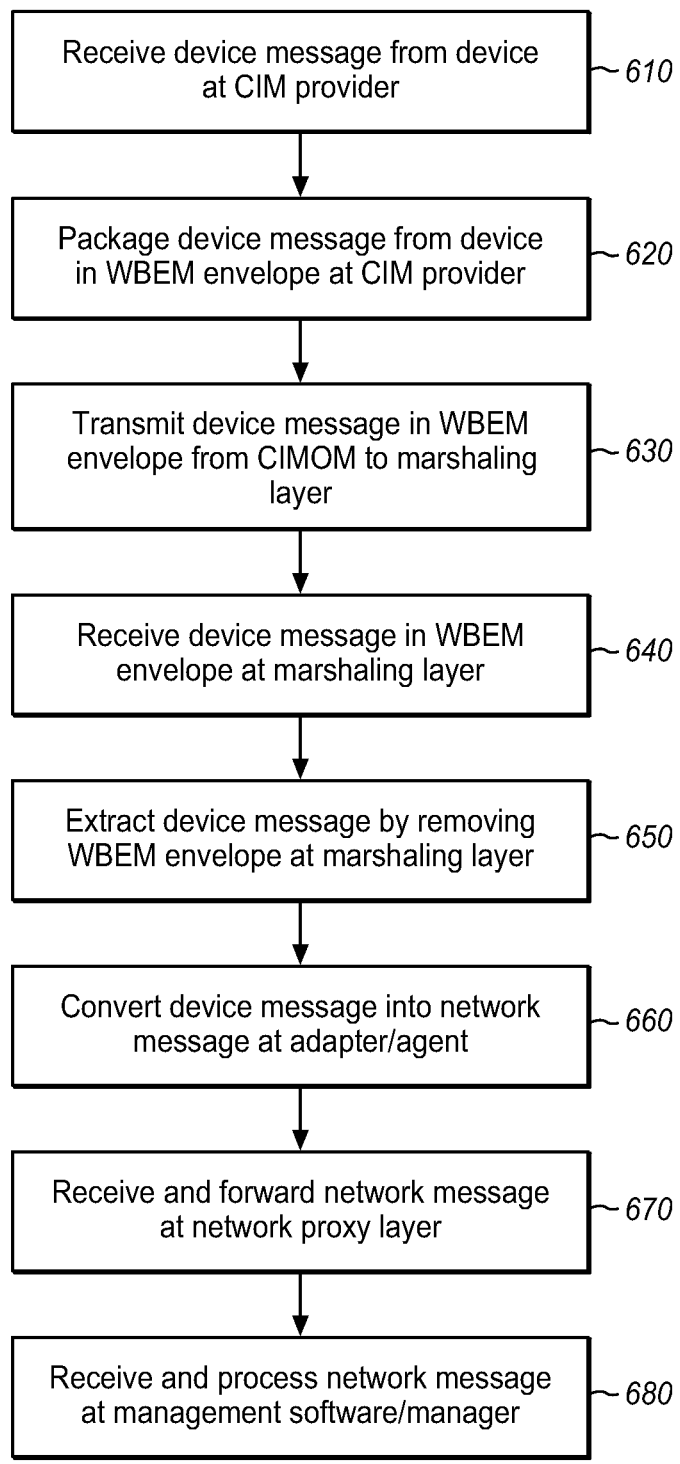
FIG. 6 is a flowchart describing alternate exemplary additional details to manage a device in a WBEM environment.

FIG. 6 is a flowchart describing alternate exemplary additional details to manage a device in a WBEM environment. At step 610, the CIM provider receives a device message from the device. At step 620, the CIM provider then packages the device message from the device in a WBEM envelope. At step 630, the CIMOM of the computer system transmits the device message in the WBEM envelope to the marshaling layer of the device management workstation (or the server management workstation).

At step 640, the marshaling layer receives the device message in the WBEM envelope. At step 650, the marshaling layer extracts the device message by removing the WBEM envelope. The device management adapter (or the server management agent) then converts the device message into a network message at step 660. At step 670, the network proxy layer receives the network message and forwards the network message to the management software (or the server manager). At step 680, the management software (or the server manager) receives and processes the network message. Accordingly, a user of the device management workstation (or the server management workstation) is able to observe the device message originated from the device in the WBEM environment by reusing non-WBEM components.

Those of ordinary skill in the art will readily recognize numerous additional and equivalent steps that may be performed and/or omitted in the methods of FIGS. 3 through 6. Such additional and equivalent steps are omitted herein merely for brevity and simplicity of this discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for managing a device in a Web Based Enterprise Management ("WBEM") environment, the method comprising:
   receiving, at a network proxy layer, a network command from a management software component;
   forwarding, from the network proxy layer, the network command to a device management adapter;
   converting the network command into a non-WBEM device-native command with the device management adapter, wherein the device-native command is in a format native to the device;
   packaging the non-WBEM device-native command in a WBEM envelope, wherein the packaging preserves the format of the non-WBEM device-native command;
   transmitting the non-WBEM device-native command in the WBEM envelope to the device; and
   issuing the non-WBEM device-native command to the device.

2. The method of claim 1, wherein the packaging step is performed at a marshaling layer, and wherein the transmitting step is performed over Hypertext Transfer Protocol ("HTTP"), the method further comprising:
   receiving, at a Common Information Model Object Manager ("CIMOM"), the device-native command in the WBEM envelope; and
   extracting, at the CIMOM, the non-WBEM device-native command by removing the WBEM envelope.

3. The method of claim 1, further comprising creating the non-WBEM native command at a Common Information Model ("CIM") provider, wherein the step of issuing is performed at the CIM provider.

4. The method of claim 1, wherein
   the packaging is performed by a Common Information Model Object Manager (CIMOM) using a Common Information Model (CIM) that has been extended to support functions for wrapping the device-native command.

5. The method of claim 4, wherein
   the converting is performed by the CIMOM using the CIM, wherein the CIM has further been extended to support functions for invoking the device-native command, and the device is a storage controller.

6. A method for managing a device in a Web Based Enterprise Management ("WBEM") environment, the method comprising:
   receiving a non-WBEM device-native command from the device, wherein the device-native command is in a format native to the device;
   packaging the non-WBEM device-native command in a WBEM envelope for transmission, wherein the packaging preserves the format of the non-WBEM device-native command;
   receiving the non-WBEM device-native command in the WBEM envelope from a computer system, wherein the computer system comprises the device;
   extracting the non-WBEM device-native command from the WBEM envelope;
   receiving a network command based on the non-WBEM device-native command from a device management adapter; and
   forwarding the network command to a management software component.

7. The method of claim 6, wherein the step of receiving the non-WBEM device-native command is performed at a Common Information Model ("CIM") provider, and wherein the step of packaging is performed at the CIM provider, the method further comprising:
   transmitting the non-WBEM device-native command in the WBEM envelope from a Common Information Model Object Manager ("CIMOM") to a marshaling layer.

8. The method of claim 6, wherein the extracting step is performed at a marshaling layer, and wherein the step of receiving the non-WBEM device-native command from the computer system is performed over Hypertext Transfer Protocol ("HTTP").

9. The method of claim 6, further comprising:
converting the non-WBEM device-native command into the network command at the device management adapter, wherein the device management adapter is also usable in a non-WBEM environment.

10. The method of claim 6, further comprising:
receiving the network command at the management software component, wherein the management software component is also usable in a non-WBEM environment.

11. A system for managing a device in a Web Based Enterprise Management ("WBEM") environment, the system comprising:
a management workstation, the management workstation comprising:
a management software component;
a device management adapter for converting a network command into a non-WBEM device-native command, wherein the device-native command is in a format native to the device;
a network proxy layer for receiving the network command from the management software component, and for forwarding the network command to the device management adapter; and
a marshaling layer for packaging the device-native command in a WBEM envelope, wherein the packaging preserves the format of the non-WBEM device-native command, and for transmitting the non-WBEM device-native command in the WBEM envelope to a computer system; and
the computer system, the computer system comprising:
the device; and
a Common Information Model ("CIM") provider for issuing the non-WBEM device-native command to the device.

12. The system of claim 11, wherein the management software component is further adapted for creating the network command, and wherein the management software component is also usable in a non-WBEM environment.

13. The system of claim 11, wherein the device management adapter is further adapted for converting the network command to the non-WBEM device-native command, and wherein the device management adapter is also usable in a non-WBEM environment.

14. The system of claim 11, wherein transmitting the device-native command in the WBEM envelope to the computer system is performed over Hypertext Transfer Protocol ("HTTP"), and wherein the computer system further comprises:
a Common Information Model Object Manager ("CIMOM") for receiving the non-WBEM device-native command in the WBEM envelope, and for extracting the non-WBEM device-native command by removing the WBEM envelope.

15. The system of claim 11, wherein the CIM provider is further adapted to create the non-WBEM native command.

16. The system of claim 11, wherein the non-WBEM device-native command is a first non-WBEM device-native command, the WBEM envelope is a first WBEM envelope, the network command is a first network command:
the CIM provider is further adapted for receiving a second non-WBEM device-native command from the device, and packaging the second non-WBEM device-native command in a second WBEM envelope for transmission;
the marshaling layer is further adapted for receiving the second non-WBEM device-native command in the second WBEM envelope from the computer system, and extracting the second non-WBEM device-native command from the second WBEM envelope; and
the network proxy layer is further adapted for receiving a second network command based on the second non-WBEM device-native command from the device management adapter, and forwarding the second network command to the management software component.

17. The system of claim 16, wherein the computer system further comprises:
a Common Information Model Object Manager ("CIMOM") for transmitting the second non-WBEM device-specific message in the second WBEM envelope from the CIMOM to the marshaling layer.

18. The system of claim 16, wherein receiving the second non-WBEM device-native command from the computer system is performed over Hypertext Transfer Protocol ("HTTP").

19. The system of claim 16, wherein the device management adapter is further adapted for converting the second non-WBEM device-native command into the second network command.

20. The system of claim 16, wherein the management software component is further adapted for receiving the second network command.

* * * * *